United States Patent
Enomoto (10) Patent No.: US 6,421,186 B2
(45) Date of Patent: Jul. 16, 2002

(54) ZOOM LENS SYSTEM

(75) Inventor: Takashi Enomoto, Chiba (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 22 days.

(21) Appl. No.: 09/745,799

(22) Filed: Dec. 26, 2000

(30) Foreign Application Priority Data

Dec. 27, 1999 (JP) .......................................... 11-371587

(51) Int. Cl.$^7$ .............................................. G02B 15/14
(52) U.S. Cl. ...................... 359/682; 359/680; 359/681; 359/692
(58) Field of Search ................ 359/680, 681, 359/682, 692

(56) References Cited

U.S. PATENT DOCUMENTS

| | | | | |
|---|---|---|---|---|
| 4,168,110 A | * | 9/1979 | Itoh | 359/680 |
| 4,196,969 A | * | 4/1980 | Itoh | 359/680 |
| 4,984,877 A | | 1/1991 | Ito | 359/692 |
| 5,566,026 A | | 10/1996 | Yoon | 359/689 |
| 5,793,533 A | | 8/1998 | Yoneyama et al. | 359/689 |
| 5,969,880 A | * | 10/1999 | Hasushita et al. | 359/689 |
| 6,324,017 B1 | * | 11/2001 | Enomoto | 359/680 |
| 6,353,507 B1 | * | 3/2002 | Enomoto | 359/689 |
| 2001/0055162 A1 | * | 12/2001 | Enomoto | 359/692 |

FOREIGN PATENT DOCUMENTS

| | | |
|---|---|---|
| JP | 10268191 | 10/1998 |

* cited by examiner

Primary Examiner—Georgia Epps
Assistant Examiner—David N. Spector
(74) Attorney, Agent, or Firm—Greenblum & Bernstein, P.L.C.

(57) ABSTRACT

A zoom lens system including a first through third lens groups. The combined power of the first and second lens groups is positive. Upon zooming from the short focal length extremity towards the long focal length extremity, all the three lens groups are moved from the image towards the object. The zoom lens system satisfies the following conditions:

$$0.01 < (d_{12W} - d_{12T})/f_W < 0.1 \quad (1);$$

$$3.5 < f_T/f_{12W} < 6.0 \quad (2);$$

$$4.0 < f_T/|f_{3G}| < 8.0 \quad (3);$$

wherein $d_{12W}$ designates the distance between the first and second lens groups at the short focal length extremity; $d_{12T}$ designates the distance between the first and second lens groups at the long focal length extremity; $f_W$ designates the focal length of the entire zoom lens system at the short focal length extremity; $f_T$ designates the focal length of the entire zoom lens system at the long focal length extremity; $f_{12W}$ designates the combined focal length of the first and second lens groups at the short focal length extremity; and $f_{3G}$ designates the focal length of the third lens group.

4 Claims, 7 Drawing Sheets

-1.0  1.0
SPHERICAL
ABERRATION
CHROMATIC
ABERRATION

— d Line
---- g Line
----- C Line

Fig. 2B
W° =28.3

-0.05  0.05
LATERAL
CHROMATIC
ABERRATION

-1.0  1.0
ASTIGMATISM

Fig. 2D
W° =28.3

-5.0 (%) 5.0
DISTORTION

Fig. 3A
F6.9

-1.0   1.0
SPHERICAL
ABERRATION

CHROMATIC
ABERRATION

Fig. 3B
W° =16.9

-0.05   0.05
LATERAL
CHROMATIC
ABERRATION

Fig. 3C
W° =16.9

-1.0   1.0
ASTIGMATISM

Fig. 3D
W° =16.9

-5.0 (%) 5.0
DISTORTION

Fig. 4A
F12.5

-1.0   1.0
SPHERICAL
ABERRATION

CHROMATIC
ABERRATION

Fig. 4B
W° =9.1

-0.05   0.05
LATERAL
CHROMATIC
ABERRATION

Fig. 4C
W° =9.1

-1.0   1.0
ASTIGMATISM

Fig. 4D
W° =9.1

-5.0 (%) 5.0
DISTORTION

-1.0    1.0
SPHERICAL
ABERRATION

CHROMATIC
ABERRATION

—— d Line
------ g Line
- - - - C Line

Fig. 6B
W° =28.4

-0.05   0.05
LATERAL
CHROMATIC
ABERRATION

Fig. 6C
W° =28.4

-1.0    1.0
ASTIGMATISM

-5.0 (%) 5.0
DISTORTION

Fig. 7A
F6.9

-1.0  1.0
SPHERICAL
ABERRATION
CHROMATIC
ABERRATION

— d Line
····· g Line
- - - C Line

Fig. 7B
W° =16.9

-0.05  0.05
LATERAL
CHROMATIC
ABERRATION

-1.0  1.0
ASTIGMATISM

Fig. 7D
W° =16.9

-5.0 (%) 5.0
DISTORTION

Fig. 8A
F12.8

-1.0  1.0
SPHERICAL
ABERRATION
CHROMATIC
ABERRATION

— d Line
····· g Line
- - - C Line

Fig. 8B
W° =8.8

-0.05  0.05
LATERAL
CHROMATIC
ABERRATION

-1.0  1.0
ASTIGMATISM

Fig. 8D
W° =8.8

-5.0 (%) 5.0
DISTORTION

—— d Line
······ g Line
- - - - C Line

-1.0    1.0
SPHERICAL
ABERRATION

CHROMATIC
ABERRATION

Fig.10B
W° =28.4

-0.05   0.05
LATERAL
CHROMATIC
ABERRATION

-1.0    1.0
ASTIGMATISM

Fig.10D
W° =28.4

-5.0 (%) 5.0
DISTORTION

Fig.11A
F6.9

-1.0  1.0
SPHERICAL
ABERRATION

CHROMATIC
ABERRATION

—— d Line
······ g Line
---- C Line

Fig.11B
W° =16.9

-0.05  0.05
LATERAL
CHROMATIC
ABERRATION

Fig.11C
W° =16.9

-1.0  1.0
ASTIGMATISM

-5.0 (%) 5.0
DISTORTION

Fig.12A
F12.5

-1.0  1.0
SPHERICAL
ABERRATION

CHROMATIC
ABERRATION

—— d Line
······ g Line
---- C Line

Fig.12B
W° =9.1

-0.05  0.05
LATERAL
CHROMATIC
ABERRATION

Fig.12C
W° =9.1

-1.0  1.0
ASTIGMATISM

-5.0 (%) 5.0
DISTORTION

Fig. 13

ZOOM LENS SYSTEM

BACKGROUND OF THE INVENTION

1. Field of the Invention

The present invention relates to a zoom lens system of a compact camera, and in particular, to attaining a high zoom ratio and miniaturization of the zoom lens system.

2. Description of the Related Art

A zoom lens system for a compact camera does not require a long back focal distance, unlike a zoom lens system for a single lens reflex (SLR) camera in which a space to provide a mirror behind the photographing lens system is required. Accordingly, in a compact camera, a telephoto type lens system including a positive lens group and a negative lens group, in this order from the object, has been employed, while in a SLR camera, a retrofocus type lens system including a negative lens group and a positive lens group, in this order from the object, has been employed. In the above two-lens-group conventional zoom lens system for a compact camera, if an attempt is made to obtain a zoom ratio of about 3.5, it has been difficult to correct aberrations, in particular, curvature of field. Therefore a three-lens-group zoom lens system in which each lens group is arranged to move independently upon zooming has been employed. In such a three-lens-group zoom lens system, a high zoom ration is obtained by moving all the three lens groups. For example, in the case where a three-lens-group zoom lens system including a positive lens group, a positive lens group and a negative lens group, in this order from the object, is provided, the distance between the first and second lens groups has to be made long in order to obtain a high zoom ratio. However, if an attempt is made to obtain a zoom ratio of about 3.5 in the above conventional positive-positive-negative zoom lens system, the distance, at the short focal length extremity, between the most object-side surface of the first lens group and the most image-side surface of the second lens group becomes long, and the diameter of the most object-side lens element in the first lens group has to be made large in order to maintain light amount at and around the short focal length extremity. An increase of the diameter of the most object-side lens element is quite disadvantageous for miniaturization of a camera.

SUMMARY OF THE INVENTION

It is an object of the present invention to provide a miniaturized three-lens-group zoom lens system which (i) has a zoom ratio of about 3.5, and (ii) can reduce the diameter of the most object-side lens element in the most object-side lens group, though the zoom lens system is the three-lens-group arrangement.

In order to achieve the above-mentioned object, there is provided a zoom lens system including a negative first lens group, a positive second lens group, and a negative third lens group, in this order from the object. The combined power of the negative first lens group and the positive second lens group is positive. In the zoom lens system, upon zooming from the short focal length extremity towards the long focal length extremity, all the three lens groups are arranged to be monotonously moved from the image side towards the object side. Further, the zoom lens system satisfies the following conditions:

$$0.01 < (d_{12W} - d_{12T})/f_W < 0.1 \quad (1)$$

$$3.5 < f_T/f_{12W} < 6.0 \quad (2)$$

$$4.0 < f_T/|f_{3G}| 8.0 \quad (3)$$

wherein $d_{12W}$ designates the distance between the first lens group and the second lens group at the short focal length extremity;

$d_{12T}$ designates the distance between the first lens group and the second lens group at the long focal length extremity;

$f_W$ designates the focal length of the entire zoom lens system at the short focal length extremity;

$f_T$ designates the focal length of the entire zoom lens system at the long focal length extremity;

$f_{12W}$ designates the combined focal length of the first lens group and the second lens group at the short focal length extremity; and $f_{3G}$ designates the focal length of the third lens group.

The zoom lens system according to the present invention can constitute a telephoto type zoom lens system which has a positive front lens group and a negative rear lens group. This is because both the first lens group and the second lens group can be considered to be a front lens group due to the above-explained positive combined power thereof, and the negative third lens group can be considered to be the rear lens group.

The zoom lens system of the present invention preferably satisfies the following condition:

$$0 < \log_e Z_{12}/\log_e Z < 0.07 \quad (4)$$

wherein $Z_{12} = f_{12\,T}/f_{12W}$;

$Z = f_T/f_W$; and $f_{12T}$ designates the combined focal length of the first lens group and the second lens group at the long focal length extremity.

The zoom lens system of the present invention preferably satisfies the following condition:

$$-2.5 < f_T/f_{3G} < -0.5 \quad (5)$$

wherein $f_{1G}$ designates the focal length of the first lens group.

For example, the first lens group can be constituted by a positive first sub-lens group and a negative second sub-lens group, in this order from the object. In this case, preferably, the first sub-lens group includes a positive single lens element, and satisfies the following condition:

$$1.4 < f_T/f_{1P} < 4.0 \quad (6)$$

wherein $f_{1P}$ designates the focal length of the first sub-lens group.

The present disclosure relates to subject matter contained in Japanese Patent Application No. Hei-11-371587 (filed on Dec. 27, 1999) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 13:
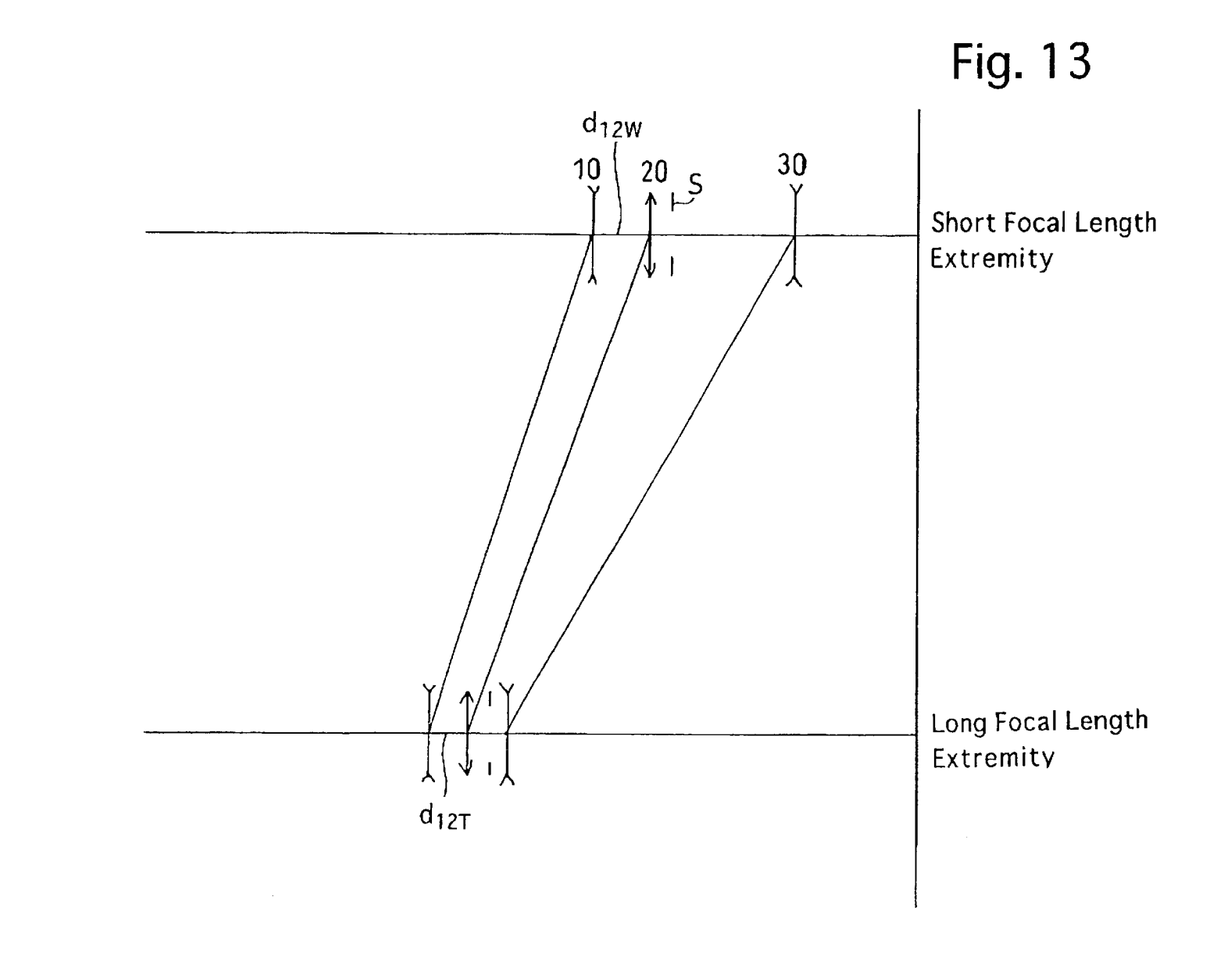
FIG. 13 shows the lens-group moving paths for the first through third embodiments.

As shown in the lens-group moving paths of FIG. 13, the zoom lens system of the present invention includes a negative first lens group 10, a positive second lens group 20, and a negative third lens group 30, in this order from the object. Upon zooming from the short focal length extremity towards the long focal length extremity, all the lens groups move from the image side towards the object side, while the distances therebetween are varied. In particular, as shown in FIG. 13, in regard to the distance $d_{12W}$ between the negative first lens group 10 and the positive second lens group 20 at the short focal length extremity, and the distance $d_{12T}$ therebetween at the long focal length extremity, it should be understood that the difference between these distances is small. A diaphragm S is provided between the second lens group 20 and the third lens group 30, and moves together with the second lens group 20.

Condition (1) specifies the change of the distances $d_{12W}$ and $d_{12T}$ between the first lens group 10 and the second lens group 20, respectively at the short focal length extremity and the long focal length extremity. By reducing the change of the distances therebetween ($d_{12W}-d_{12T}$) so that condition (1) is satisfied, the distance, at the short focal length extremity, from the most object-side surface of the first lens group 10 to the most image-side surface of the second lens group 20 can be reduced, and the diameter of the most object-side lens element of the first lens group 10 can be reduced, thereby miniaturization of the lens system can be attained.

If $(d_{12W}-d_{12T})/f_W$ exceeds the upper limit of condition (1), the amount of the distance-change between the first lens group 10 and the second lens group 20 becomes large, so that it is difficult to attain miniaturization of the lens system.

If $(d_{12W}-d_{12T})/f_W$ exceeds the lower limit of condition (1), an effect of zooming due to changing the distance between the first lens group 10 and the second lens group 20 cannot be obtained.

Condition (2) specifies the combined focal length of the first lens group 10 and the second lens group 20. By satisfying this condition, the traveling distances of the first and second lens groups can be reduced, so that miniaturization of the lens system can be attained.

If $f_T/f_{12W}$ exceeds the upper limit of condition (2), the combined power of the first lens group 10 and that of the second lens group 20 become too strong, so that aberrations occurred in these lens groups become large. Consequently, fluctuations of aberrations upon zooming becomes large.

If $f_T/f_{12W}$ exceeds the lower limit of condition (2), the traveling distances of the first and second lens groups become long, so that it is difficult to attain miniaturization of the lens system.

Condition (3) specifies the focal length of the negative third lens group 30. By satisfying this condition, the traveling distance of the third lens group 30 can be reduced, so that miniaturization of the lens system can be attained.

If $f_T/|f_{3G}|$ exceeds the upper limit of condition (3), the power of the third lens group 30 becomes too strong. As a result, aberrations occurred in the third lens group 30 become large, so that fluctuations of aberrations upon zooming become large.

If $f_T/|f_{3G}|$ exceeds the lower limit of condition (3), the traveling distance of the third lens group 30 becomes long, so that miniaturization of the lens system cannot be attained.

Condition (4) specifies the combined focal length of the first lens group 10 and the second lens group 20. By satisfying this condition, the change of the distance between these lens groups can be reduced, and miniaturization of the lens system cannot be attained.

If $\log_e Z_{12}/\log_e Z$ exceeds upper limit of condition (4) the change of the distance between the first and second lens groups becomes large, so that miniaturization of the lens system cannot be attained.

If $\log_e Z_{12}/\log_e Z$ exceeds lower limit of condition (4), an effect of zooming due to changing the distance between the first lens group 10 and the second lens group 20 cannot be obtained.

Condition (5) specifies the focal length of the negative first lens group 10. By satisfying this condition, the traveling distance of the first lens group 10 can be reduced, so that miniaturization of the lens system can be attained.

If $f_T/f_{1G}$ exceeds the upper limit of condition (5), the traveling distance of the first lens group 10 becomes long, so that miniaturization of the lens system cannot be attained.

If $f_T/f_{1G}$ exceeds the lower limit of condition (5), the power of the first lens group 10 becomes too strong, aberrations occurred therein become large. As a result, fluctuations of aberrations upon zooming is large.

Condition (6) specifies the focal length of a positive first sub-lens group 10a in the case where the negative first lens group 10 includes the positive first sub-lens group 10a and a negative second sub-lens group 10b in this order from the object. By satisfying this condition, the divergence of the negative first lens group 10 can be corrected, so that aberrations occurred therein can be made small.

If $f_T/f_{1P}$ exceeds the upper limit of condition (6), the power of the first sub-lens group 10a becomes too strong, so that production thereof is difficult.

If $f_T/f_{1P}$ exceeds the lower limit of condition (6), diverging aberrations in the negative first lens group 10 cannot be reduced.

Specific numerical data of the embodiments will be described hereinafter. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the solid line and the two types of dotted lines respectively indicate magnification with respect to the d, g and C lines. S designates the sagittal image, and M designates the meridional image. In the tables, Fno designates the F-number, f designates the focal length of the entire zoom lens system, m designates the transverse magnification, W designates the half angle-of-view (°), fB designates the back focal distance, r designates the radius of curvature, d designates the lens-element thickness or distance between lens elements, Nd designates the refractive index at the d-line, and v designates the Abbe number.

In addition to the above, an aspherical surface which is symmetrical with respect to the optical axis is defined as follows:

$$x = Cy^2/(1+[1-\{1+K\}c^2y^2]^{1/2}) + A4y^4 + A6y^6 + A8y^8 + A10y^{10}$$

wherein:

x designates a distance from a tangent plane of an aspherical vertex;

c designates a curvature of the aspherical vertex (1/r);

h designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

[Embodiment 1]

Figure 1:
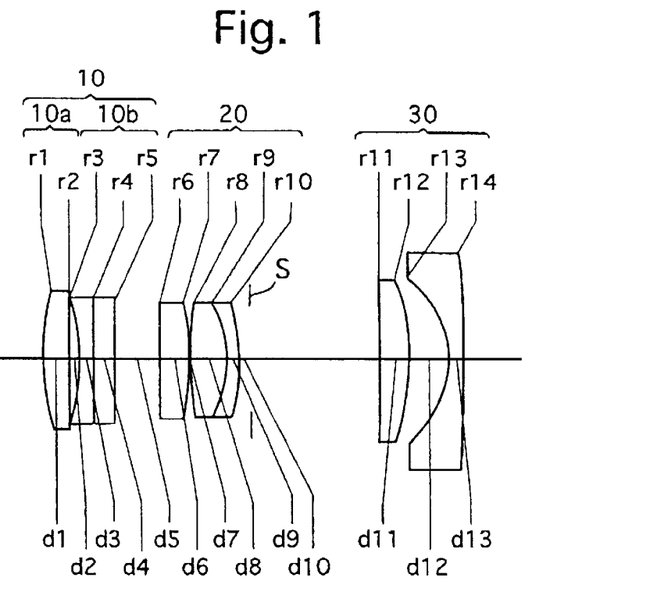
FIG. 1 is a lens arrangement of a zoom lens system according to a first embodiment of the present invention.
Figure 2A:
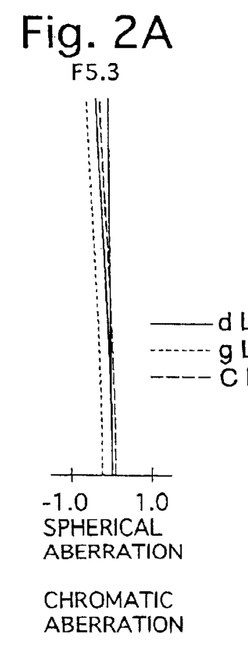
FIGS. 2A, 2B, 2C and 2D show aberrations, at the short focal length extremity, occurred in the lens arrangement shown in FIG. 1.
Figure 2B:
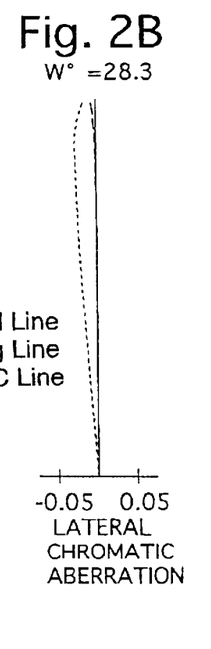
Figure 2C:
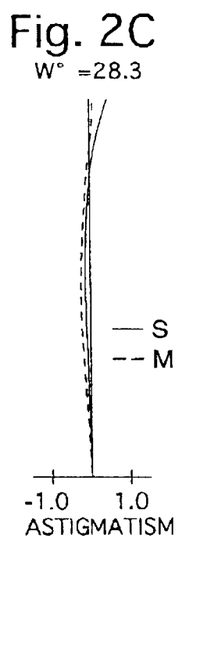
Figure 2D:
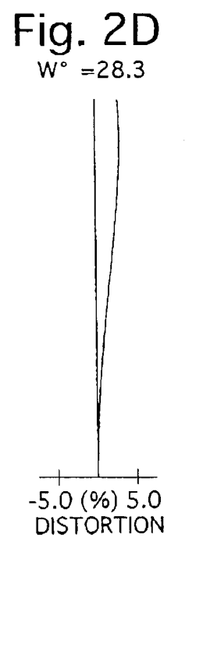
Figures 3A, 3B:
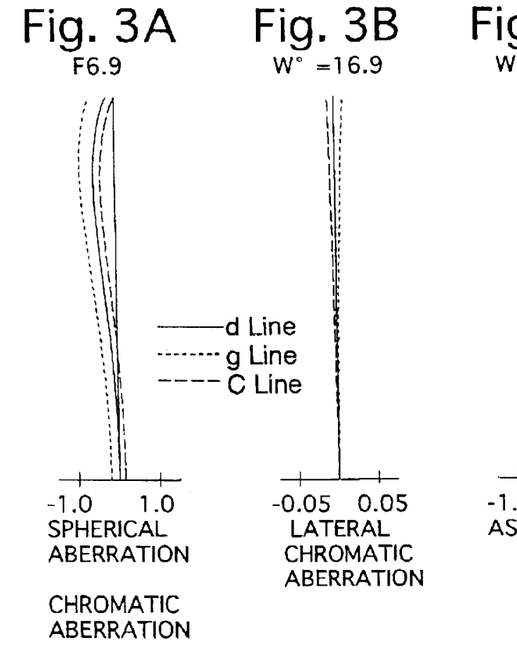
FIGS. 3A, 3B, 3C and 3D show aberrations, at an intermediate focal length, of the lens arrangement shown in FIG. 1.
Figures 3C, 3D:
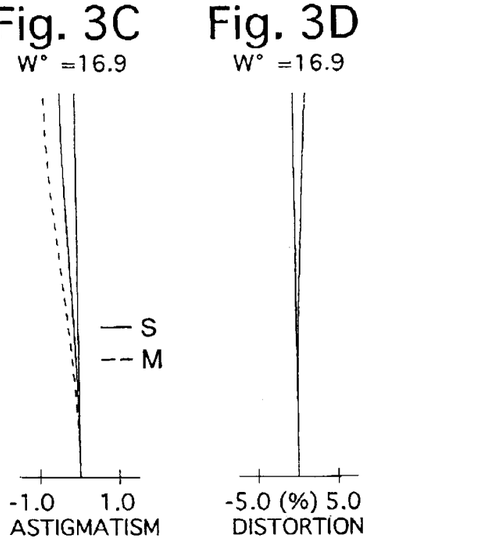
Figures 4A, 4B:
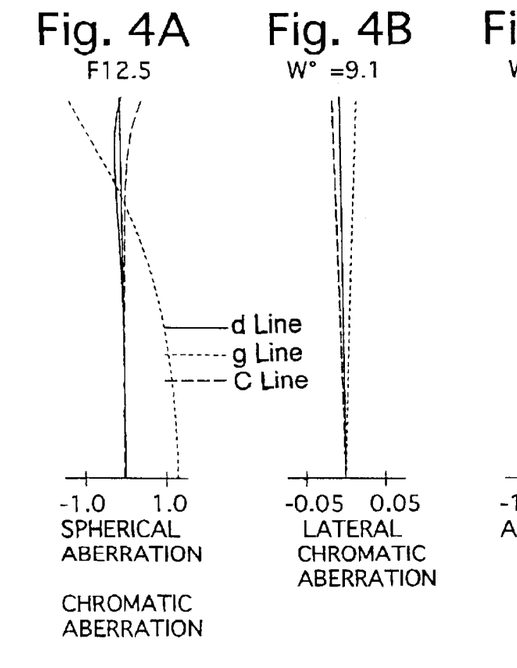
FIGS. 4A, 4B, 4C and 4D show aberrations, at the long focal length extremity, of the lens arrangement shown in FIG. 1.
Figures 4C, 4D:
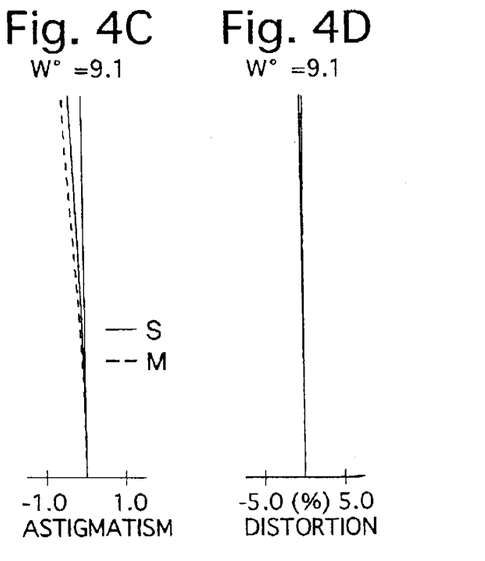

FIG. 1 is a lens arrangement of a zoom lens system according to the first embodiment of the present invention. FIGS. 2A through 2D show aberrations, at the short focal length extremity, occurred in the lens arrangement shown in FIG. 1. FIGS. 3A through 3D show aberrations, at an intermediate focal length, of the lens arrangement shown in FIG. 1. FIGS. 4A through 4D show aberrations, at the long focal length extremity, of the lens arrangement shown in FIG 1. Table 1 shows the numerical data thereof. Surface Nos. 1 through 5 represent the negative first lens group 10, surface Nos. 6 through 10 represent the positive second lens group 20, and surface Nos. 11 through 14 represent the negative third lens group 30. The first lens group 10 is constituted by a positive lens element, and cemented lens elements including a negative lens element and a positive lens element, in this order from the object. The second lens group 20 is constituted by a positive lens element, and cemented lens elements including a positive lens element and a negative lens element, in this order from the object. The third lens group 30 is constituted by a positive lens element and a negative lens element, in this order from the object. Furthermore, the first lens group 10 is constituted by a positive first sub-lens group (single lens element) 10a (surface Nos. 1 and 2), and a negative second sub-lens group (negative-positive cemented lens elements in this order from the object) 10b (surface Nos. 3 through 5).

TABLE 1

$F_{NO}$ = 1:5.3–6.9–12.5
f = 39.00–70.00–135.00 (zoom ratio: 3.46)
W = 28.3–16.9–9.1
$f_B$ = 10.73–35.41–86.88

| Surface No. | r | d | Nd | v |
|---|---|---|---|---|
| 1 | 24.813 | 2.30 | 1.48000 | 70.0 |
| 2 | −593.823 | 0.93 | — | — |
| 3 | −18.110 | 1.20 | 1.64757 | 38.9 |
| 4 | 75.529 | 2.06 | 1.68893 | 31.1 |
| 5* | −385.488 | 4.06–3.60–3.14 | — | — |
| 6 | −1535.221 | 2.62 | 1.48749 | 70.2 |
| 7 | −24.075 | 0.10 | — | — |
| 8 | 38.413 | 3.26 | 1.52882 | 57.7 |
| 9 | −10.631 | 1.10 | 1.81612 | 44.4 |
| 10 | −19.305 | 1.00 | — | — |
| Diaphragm | ∞ | 11.60–5.62–1.99 | — | — |
| 11* | −56.547 | 2.53 | 1.58547 | 29.9 |
| 12 | −21.271 | 3.45 | — | — |
| 13 | −10.106 | 1.40 | 1.77500 | 49.7 |
| 14 | −102.555 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 5 | 0.00 | −0.1848 × 10⁻⁴ | −0.4397 × 10⁻⁷ | — |
| 11 | 0.00 | 0.7054 × 10⁻⁴ | 0.3686 × 10⁻⁶ | 0.2590 × 10⁻⁸ |

[Embodiment 2]

Figure 5:
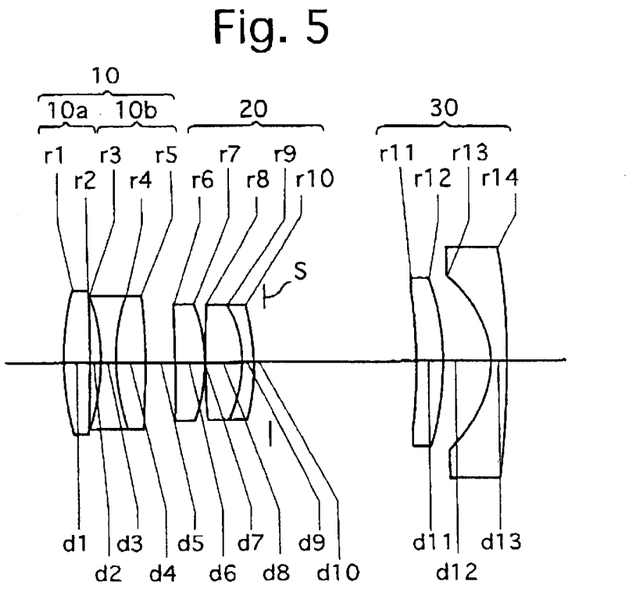
FIG. 5 is a lens arrangement of a zoom lens system according to a second embodiment of the present invention.
Figures 6A, 6B:
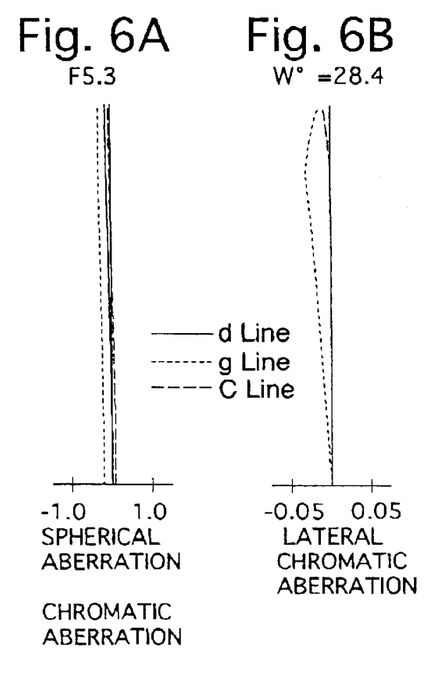
FIGS. 6A, 6B, 6C and 6D show aberrations, at the short focal length extremity, occurred in the lens arrangement shown in FIG. 5.
Figure 6C:
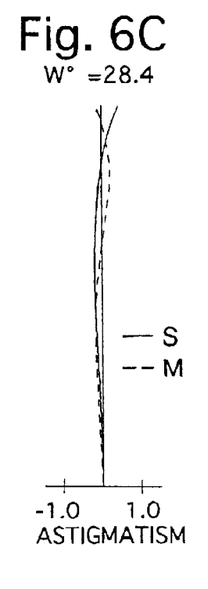
Figure 6D:
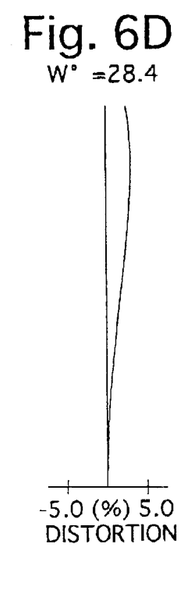
Figures 7A, 7B:
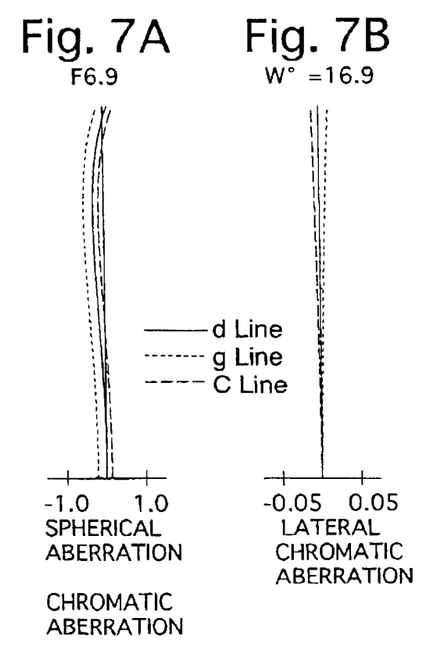
FIGS. 7A, 7B, 7C and 7D show aberrations, at an intermediate focal length, of the lens arrangement shown in FIG. 5.
Figure 7C:
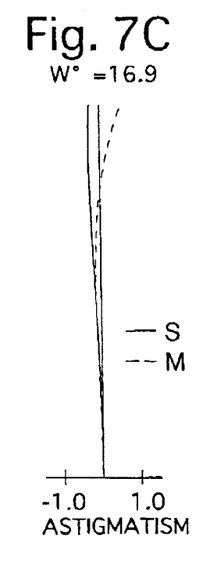
Figure 7D:
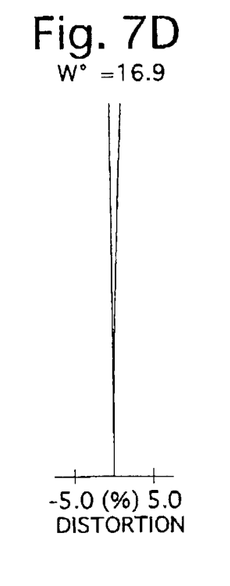
Figures 8A, 8B:
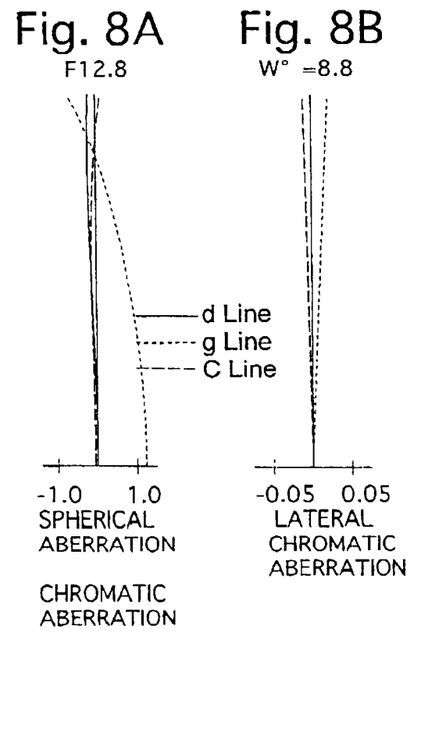
FIGS. 8A, 8B, 8C and 8D show aberrations, at the long focal length extremity, of the lens arrangement shown in FIG. 5.
Figure 8C:
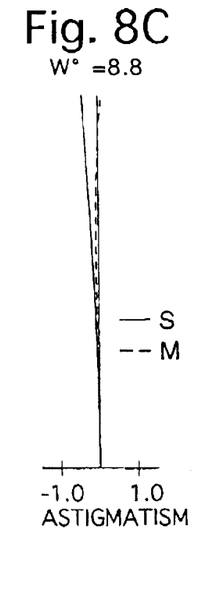
Figure 8D:
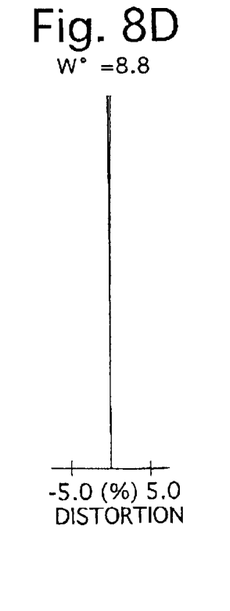

FIG. 5 is a lens arrangement of a zoom lens system according to the second embodiment of the present invention. FIGS. 6A through 6D show aberrations, at the short focal length extremity, occurred in the lens arrangement shown in FIG. 5. FIGS. 7A through 7D show aberrations, at an intermediate focal length, of the lens arrangement shown in FIG. 5. FIGS. 8A through 8D show aberrations, at the long focal length extremity, of the lens arrangement shown in FIG. 5. Table 2 shows the numerical data thereof. The basic lens construction and the movement of the lens groups is the same as the first embodiment.

TABLE 2

$F_{NO}$ = 1:5.3–6.9–128
f = 39.00–70.00–140.00 (zoom ratio: 3.59)
W = 28.4–16.9–8.8
$f_B$ = 9.14–34.20–90.60

| Surface No. | r | d | Nd | v |
|---|---|---|---|---|
| 1 | 24.518 | 2.30 | 1.55234 | 59.2 |
| 2 | −296.557 | 1.03 | — | — |
| 3 | −17.830 | 1.20 | 1.80460 | 33.0 |
| 4 | 19.584 | 2.56 | 1.72870 | 28.2 |
| 5 | −68.966 | 2.58–2.30–2.02 | — | — |
| 6 | −219.350 | 2.62 | 1.48749 | 70.2 |
| 7 | −15.969 | 0.10 | — | — |
| 8 | 111.163 | 3.26 | 1.49877 | 61.6 |
| 9 | −11.101 | 1.10 | 1.80400 | 46.6 |
| 10 | −19.450 | 1.00 | — | — |
| Diaphragm | ∞ | 13.23–6.34–1.99 | — | — |
| 11* | −42.253 | 2.53 | 1.58547 | 29.9 |
| 12 | −22.886 | 4.17 | — | — |

TABLE 2-continued $F_{NO}$ = 1:5.3–6.9–128
f = 39.00–70.00–140.00 (zoom ratio: 3.59)
W = 28.4–16.9–8.8
$f_B$ = 9.14–34.20–90.60

| Surface No. | r | d | Nd | ν |
|---|---|---|---|---|
| 13 | −10.292 | 1.40 | 1.69000 | 56.2 |
| 14 | −86.931 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 11 | 0.00 | $0.7141 \times 10^{-4}$ | $0.1977 \times 10^{-6}$ | $0.3589 \times 10^{-8}$ |

[Embodiment 3]

Figure 9:
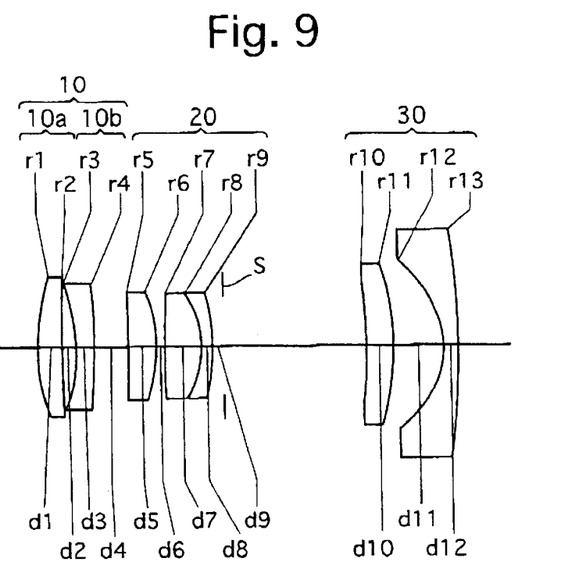
FIG. 9 is a lens arrangement of a zoom lens system according to a third embodiment of the present invention.
Figures 10A, 10B:
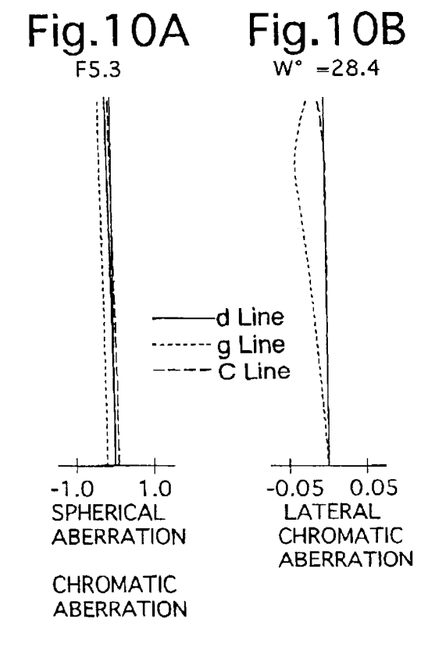
FIGS. 10A, 10B, 10C and 10D show aberrations, at the short focal length extremity, occurred in the lens arrangement shown in FIG. 9.
Figure 10C:
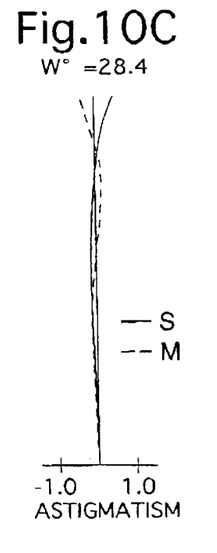
Figure 10D:
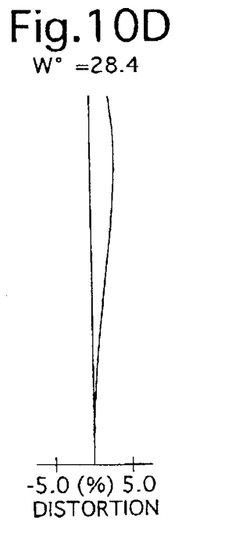
Figures 11A, 11B:
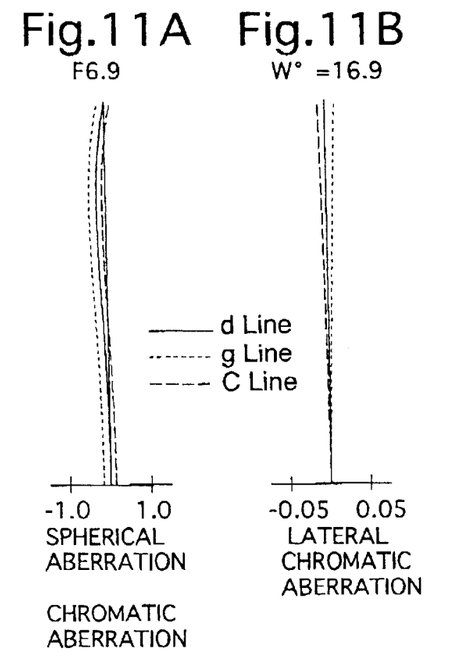
FIGS. 11A, 11B, 11C and 11D show aberrations, at an intermediate focal length, of the lens arrangement shown in FIG. 9.
Figure 11C:
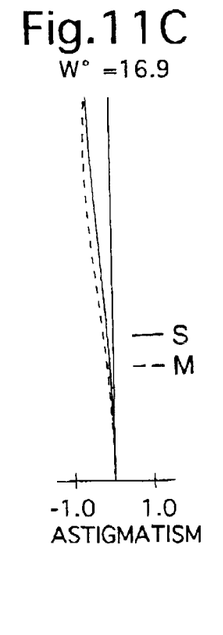
Figure 11D:
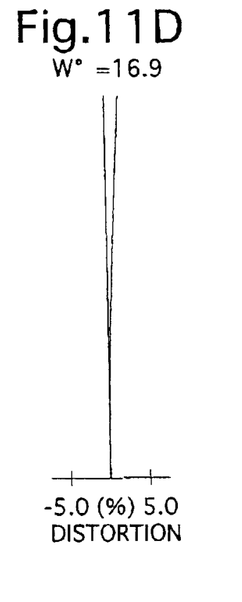
Figures 12A, 12B:
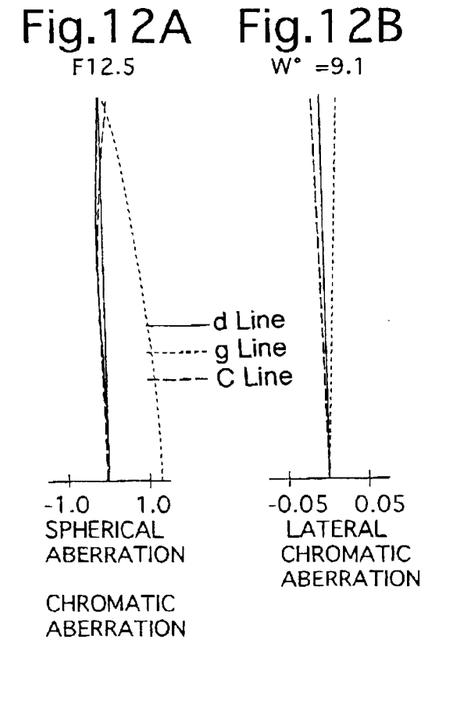
FIGS. 12A, 12B, 12C and 12D show aberrations, at the long focal length extremity, of the lens arrangement shown in FIG. 9.
Figure 12C:
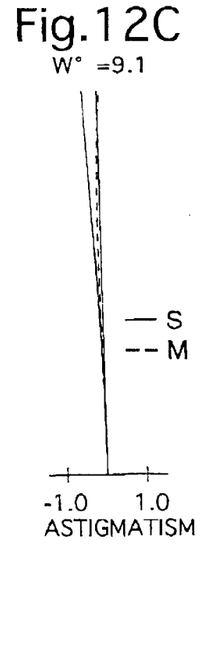
Figure 12D:
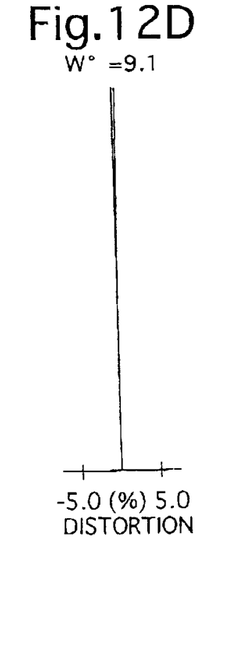

FIG. 9 is a lens arrangement of a zoom lens system according to the third embodiment of the present invention. FIGS. 10A through 10D show aberrations, at the short focal length extremity, occurred in the lens arrangement shown in FIG. 9. FIGS. 11A through 11D show aberrations, at an intermediate focal length, of the lens arrangement shown in FIG. 9. FIGS. 12A through 12D show aberrations, at the long focal length extremity, of the lens arrangement shown in FIG. 9. Table 3 shows the numerical data thereof. Surface Nos. 1 through 4 represent the negative first lens group 10, surface Nos. 5 through 9 represent the positive second lens group 20, and surface Nos. 10 through 13 represent the negative third lens group 30. The first lens group 10 is constituted by a positive lens element, and a negative lens element, in this order from the object. The second lens group 20 is constituted by a positive lens element, and cemented lens elements including a positive lens element and a negative lens element, in this order from the object. The third lens group 30 is constituted by a positive lens element and a negative lens element, in this order from the object. Furthermore, the first lens group 10 is constituted by a positive first sub-lens group (single lens element) 10a (surface Nos. 1 and 2), and a negative second sub-lens group (single lens element) 10b (surface Nos. 3 and 4).

TABLE 3

$F_{NO}$ = 1:5.3–6.9–12.5
f = 39.00–70.00–135.00 (zoom ratio: 3.46)
W = 28.4–16.9–9.1
$f_B$ = 8.72–33.19–84.22

| Surface No. | r | d | Nd | ν |
|---|---|---|---|---|
| 1 | 20.889 | 2.30 | 1.48089 | 69.6 |
| 2 | 184.972 | 1.18 | — | — |
| 3* | −17.730 | 1.50 | 1.84666 | 41.7 |
| 4* | −70.882 | 3.22–3.00–2.72 | — | — |
| 5 | −197.826 | 2.62 | 1.48030 | 67.6 |
| 6 | −15.553 | 0.70 | — | — |
| 7 | 111.299 | 3.26 | 1.50101 | 58.2 |
| 8 | −10.429 | 1.10 | 1.80400 | 46.6 |
| 9 | −18.074 | 1.00 | — | — |
| Diaphragm | ∞ | 13.01–6.17–2.04 | — | — |
| 10* | −51.096 | 2.53 | 1.58547 | 29.9 |
| 11 | −26.692 | 4.41 | — | — |

TABLE 3-continued $F_{NO}$ = 1:5.3–6.9–12.5
f = 39.00–70.00–135.00 (zoom ratio: 3.46)
W = 28.4–16.9–9.1
$f_B$ = 8.72–33.19–84.22

| Surface No. | r | d | Nd | ν |
|---|---|---|---|---|
| 12 | −10.340 | 1.40 | 1.69000 | 56.2 |
| 13 | −83.401 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 3 | 0.00 | $0.2451 \times 10^{-4}$ | $-0.5420 \times 10^{-6}$ | — |
| 4 | 0.00 | $0.2998 \times 10^{-4}$ | $-0.5386 \times 10^{-6}$ | — |
| 10 | 0.00 | $0.7348 \times 10^{-4}$ | $0.1225 \times 10^{-6}$ | $0.3939 \times 10^{-8}$ |

Table 4 shows the numerical values of each condition of each embodiment.

TABLE 4

| | Embodiment 1 | Embodiment 2 | Embodiment 3 |
|---|---|---|---|
| Cond. (1) | 0.024 | 0.015 | 0.013 |
| Cond. (2) | 5.25 | 5.11 | 4.89 |
| Cond. (3) | 6.49 | 6.26 | 6.14 |
| Cond. (4) | 0.011 | 0.006 | 0.007 |
| Cond. (5) | −1.57 | −1.60 | −1.74 |
| Cond. (6) | 2.72 | 3.41 | 2.77 |

As can be understood by the above, each embodiment satisfies each condition. Furthermore, as shown in the aberration diagrams, the various aberrations are adequately corrected.

[0024]

According to the above description, a miniaturized three-lens-group zoom lens system which has the following features can be obtained, though the zoom lens system is the three-lens-group arrangement in which a negative lens group, a positive lens group and a negative lens group in this order from the object are provided:

(i) a zoom ratio is about 3.5; and (ii) the diameter of the most object-side lens element in the most object-side lens group can be reduced.

What is claimed is:

1. A zoom lens system comprising a negative first lens group, a positive second lens group, and a negative third lens group, in this order from an object, wherein the combined power of said negative first lens group and said positive second lens group is positive, wherein upon zooming from the short focal length extremity towards the long focal length extremity, all of said three lens groups are arranged to be monotonously moved from the image side towards the object side, and wherein said zoom lens system satisfies the following conditions:

$0.01 < (d_{12W} - d_{12T})/f_W < 0.1$ $3.5 < f_T/f_{12W} < 6.0$ $4.0 < f_T/|f_{3G}| < 8.0$ wherein $d_{12W}$ designates the distance between said first lens group and said second lens group at the short focal length extremity;

$d_{12T}$ designates the distance between said first lens group and said second lens group at the long focal length extremity;

$f_W$ designates the focal length of the entire zoom lens system at the short focal length extremity;

$f_T$ designates the focal length of the entire zoom lens system at the long focal length extremity;

$f_{12W}$ designates the combined focal length of said first lens group and said second lens group at the short focal length extremity; and $f_{3G}$ designates the focal length of said third lens group.

2. The zoom lens system according to claim 1, satisfying the following condition:

$$0<\log_e Z_{12}/\log_e Z<0.07$$

wherein $Z_{12}=f_{12T}/f_{12W}$;
$Z=f_T/f_W$; and $f_{12T}$ designates the combined focal length of said first lens group and said second lens group at the long focal length extremity.

3. The zoom lens system according to claim 1, satisfying the following condition:

$$-2.5 < f_T/f_{1G} < -0.5$$

wherein $f_{1G}$ designates the focal length of said first lens group.

4. The zoom lens system according to claim 1, wherein said first lens group comprises a positive first sub-lens group and a negative second sub-lens group, in this order from said object, wherein said first sub-lens group comprises a positive single lens element, and satisfies the following condition:

$$1.4 < f_T/f_{1P} < 4.0$$

wherein $f_{1P}$ designates the focal length of said first sub-lens group.

* * * * *